Aug. 9, 1960 L. B. LUELLEN Re. 24,859
FURNACE STRUCTURE
Original Filed March 23, 1953 7 Sheets-Sheet 1
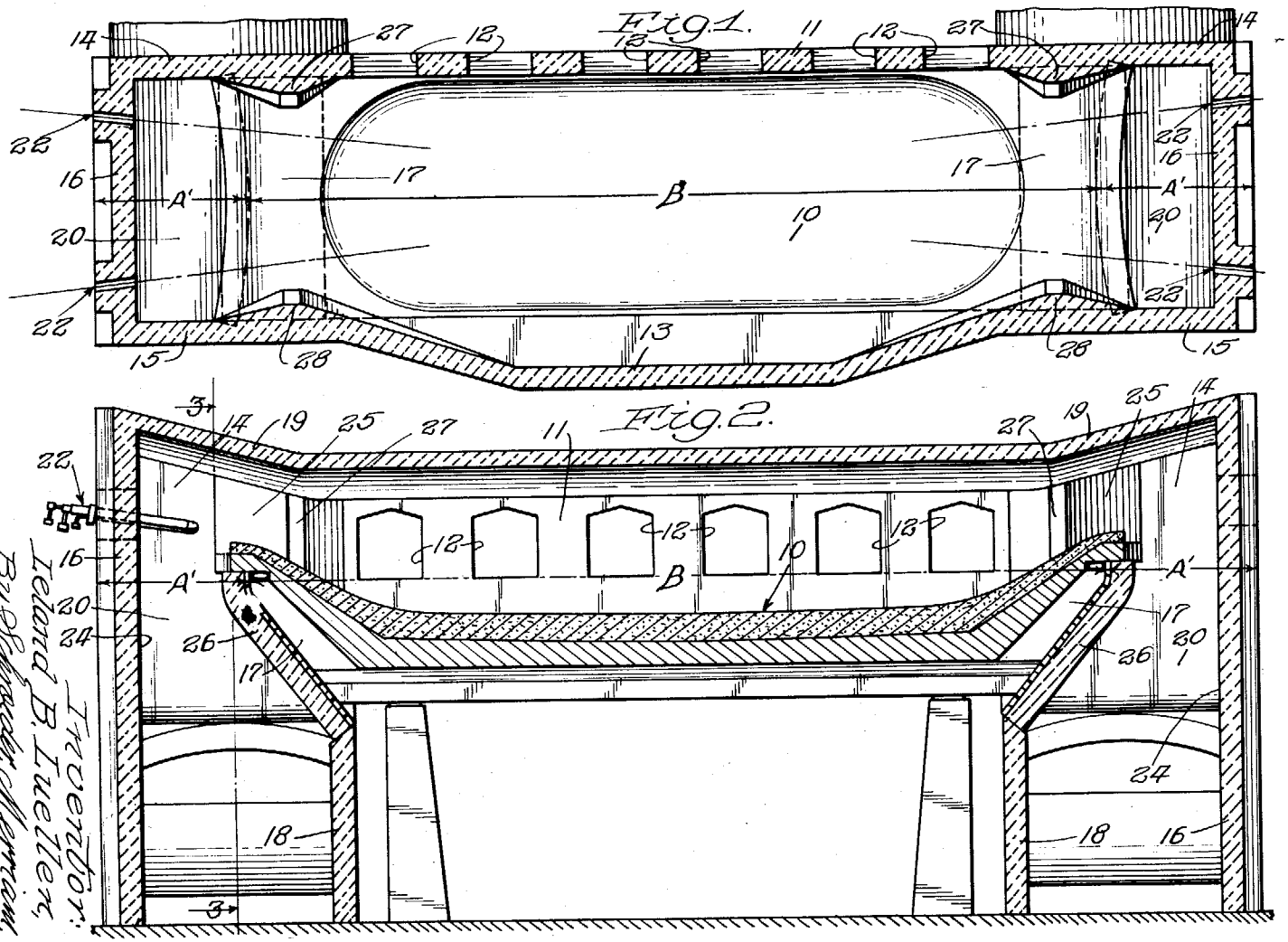
Inventor:
Leland B. Luellen,
By Schroeder, Merriam, Hofgren & Brady, Attys.

FURNACE STRUCTURE

Original Filed March 23 1953 7 Sheets-Sheet 2

Inventor:
Leland B. Luellen,
By Schroeder, Merriam,
Hofgren & Brady, Attys.

FURNACE STRUCTURE

Original Filed March 23, 1953 7 Sheets-Sheet 3

Inventor:
Leland B. Luellen,
By Schroeder, Merriam,
Hofgren & Brady, Att'ys.

Inventor:
Leland B. Luellen,
By Schroeder Merriam,
Hofgren & Brady, Attys.

FURNACE STRUCTURE

Original Filed March 23, 1953 7 Sheets-Sheet 5

Inventor:
Leland B. Luellen,
By Schroeder, Merriam,
Hofgren, Brady, Attys.

FURNACE STRUCTURE

Original Filed March 23, 1953 7 Sheets-Sheet 6

Inventor:
Leland B. Luellen,
By Schroeder, Merriam,
Hofgren & Brady, Attys

FURNACE STRUCTURE

Original Filed March 23, 1953 7 Sheets-Sheet 7

Inventor:
Leland B. Luellen,
By Schroeder, Merriam, Hofgren & Brady, Attys.

United States Patent Office

Re. 24,859
Reissued Aug. 9, 1960

24,859

FURNACE STRUCTURE

Leland B. Luellen, Highland, Ind., assignor to Inland Steel Company, a corporation of Delaware Original No. 2,679,389, dated May 25, 1954, Ser. No. 343,874, Mar. 23, 1953. Application for reissue Aug. 11, 1959, Ser. No. 833,118

14 Claims. (Cl. 263—15)

Matter enclosed in heavy brackets [ ] appears in the original patent but forms no part of this reissue specification; matter printed in italics indicates the additions made by reissue.

This invention relates to open hearth furnaces used for the production of steel and to a new and improved structure of the end sections of such furnaces.

This application is a continuation-in-part of my copending application Serial No. 221,686 filed April 18, 1951, now abandoned.

In general, an open hearth furnace consists of a number of cooperating structures or parts which are built primarily of refractory brick and other refractory materials and, secondly, of steel which is used principally as supports for, or as binding and bracing to, the refractory constructions. The actual production operations take place in the hearth section, the working surface of which is shaped somewhat like a shallow elliptical bowl. This hearth is enclosed on one of its long sides by a refractory brick section known as a front-wall which is equipped with doors through which the heat materials are charged and worked by the furnace personnel. The opposite long side of the hearth is enclosed by another refractory construction known as the backwall. The upper limits of the front-wall and back-wall are joined together by an arched or suspended refractory brick roof over the hearth and this is commonly referred to as the main roof of the furnace.

The furnace construction extends some distance past the hearth ends to provide space for air and/or gas passages and for the fuel-introducing agencies and constructions. The furnace end sections and inner constructions referred to are sometimes called port-ends and sometimes simply the "furnace ends." The outer structure of these port-ends is formed by brickwork extensions to the front and back-walls, such extensions being commonly referred to as front and back wing-walls. These wing-walls at each end of the furnace join with a brick end-wall which marks the length limits of the furnace proper, except for the steel binding. The wing-walls and their adjacent end-wall are joined at their upper limits by an arched or suspended roof sometimes called the hood section, which in turn extends toward and joins the main roof over the hearth proper. The result is to bring about an enclosed rectangularly shaped construction known as the furnace proper which contains the hearth and a substantially similar end section adjacent to each end of the hearth in which are contained the fuel-introducing equipment and constructions and substantially vertical passageways for incoming air and outgoing gases, said passageways being commonly called uptakes, and functioning principally in cooperation with adjacent passageways not here concerned, to join the functions of the regenerative system with the functions of the hearth section.

The refractory brick and refractory materials from which the furnace hearth is constructed are supported at the hearth ends by refractory protected structural members or steel frameworks sometimes known as chill boxes. These latter constructions are situated between the ends of the hearth and the passages above referred to and the walls or arches protecting the supporting steelwork referred to participate in forming the inward wall of the uptake passage on its respective end, regardless of the construction detail or shape of said protecting walls or arches which may vary somewhat from furnace to furnace.

Fuel to support the steelmaking process is introduced through the end-walls already described. These end-walls participate in forming that part of the uptake sections opposite the chill boxes referred to. The uptakes are formed on the other two sides by the lower parts of the front and back wing-walls which are extended downwardly toward another passage leading directly to the regenerators.

In actual practice, the steelmaking materials are charged through the front-wall doors into the hearth section. Fuel is introduced through the end-walls and directed toward the hearth, being fired first from one end and then the other for brief periods. Air to support combustion of the fuel and also to provide oxygen to support the chemical reactions which take place in the hearth is pre-heated by passing through regenerators also adapted to alternating handling of incoming air and outgoing gases. The regenerators are generally located some distance away from the hearth section and usually below and/or to one side of the hearth proper. The regenerator system is not here described because it is not directly related to the teachings of this invention. After preheating, the air is carried by various constructions from the regenerators to the lower sections of the uptake passages previously described which then function to carry the said pre-heated air to juncture with the fuel. The waste gases leaving the hearth section pass through the uptakes on the opposite end from the incoming air on their way back to the regenerative system.

In existing open-hearth furnace end structures the uptake passage is generally divided into two or more parts separated by a heavy refractory brick arch and wall which strengthens the structure and helps support brickwork about the chill boxes at the ends of the hearth section. This center wall has been used in the past to support so called doghouses of refractory material surrounding the fuel-introducing agencies to protect them from the high temperatures of the combustion products which pass around them in leaving the furnace. Considerable baffling and channeling of the gases resulted because of this obstruction in the furnace ends.

This invention contemplates rebuilding the furnace end structures without changing the outside dimensions of the furnace to secure additional furnace capacity or increased uptake capacity, or both, as required by the particular furnace. It also contemplates the construction of new furnaces within the teachings of this invention. In accomplishing these general objectives, the furnace ends are reconstructed to provide a single uptake passage shaped in a particular manner to provide an even flow of air to the fuel-introducing agencies. At the same time erosion of the refractory elements is lessened by reduction of baffling, channeling and the like of the exiting combustion gases.

This invention also contemplates a series of changes to the construction of the end sections of open hearth furnaces which may be applied singly or in cooperation with one another to increase the productive capacity of existing furnaces without requiring alteration to their outside dimensions, and secondly, to construction of new furnaces capable of higher production rates than comparably sized furnaces would otherwise have. In accomplishing these objectives, the separating constructions dividing the uptake into two or more parts are eliminated to provide a single uptake passage, which is unobstructed, and therefore has a greater carrying capacity. The passage is also shaped to provide a greater air capacity per square foot of cross section than the divided uptakes in addition to being free of channeling influences which tend to direct the air away from the fuel-introducing agencies.

The invention will be described in connection with the accompanying drawings some of which show the furnace somewhat diagrammatically for the purposes of clarity, and in which:

Fig. 1 is a plan view of an open-hearth furnace with the roof removed and embodying the invention;

Fig. 2 is a vertical sectional view of the furnace shown in Fig. 1;

Figure 3:
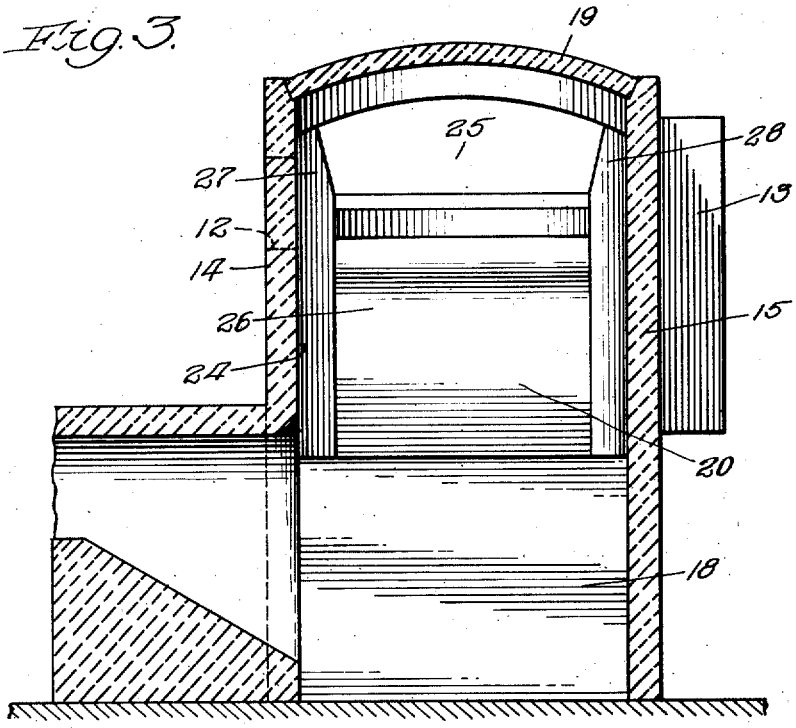
Fig. 3 is a sectional view taken substantially along line 3—3 in Fig. 2.

The open-hearth furnace illustrated in the drawings has the basic parts found in most furnaces of this type. The hearth section 10 is adapted to contain the molten material from which the steel product is tapped. This hearth section is supported on a steel framework and built up of refractory and fused material to withstand the high heats of the furnaces. The front wall 11 of the furnace is provided with a number of charging doors 12 through which the ore, scrap and other material may be charged into the hearth section. A back wall 13 (the pit side of the furnace) extends along generally parallel to the front wall of the furnace and these walls are joined by the furnace end structure comprising wing walls 14 and 15 and an end wall 16. The walls of the furnace are shown diagrammatically, in that the thickness of the brick is indicated and the binding or buckstays on the outside of the walls are omitted since they are of usual construction.

At each end of the hearth section 10 a chill box 17 is provided to form the end of the hearth section. The chill box is adequately protected with refractory elements and is supported by a chill or section wall 18 which also serves as one of the bounding walls of the uptake passage 20. The bottom portion of the furnace end is the slag pit. Each end of the furnace is a duplicate of the other and as this description progresses reference to any part of the furnace end structure may refer to either end of the furnace. An arched roof 19 extends between the front and back walls and joins at its ends with the end walls.

Figure 4:
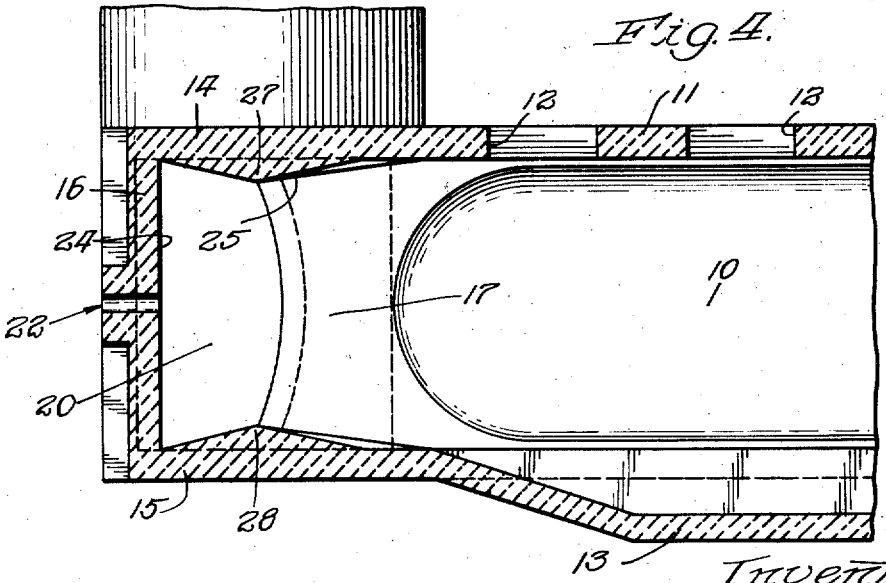
Fig. 4 is a fragmentary plan view similar to Fig. 1 showing another furnace end structure including the invention.
Figure 5:
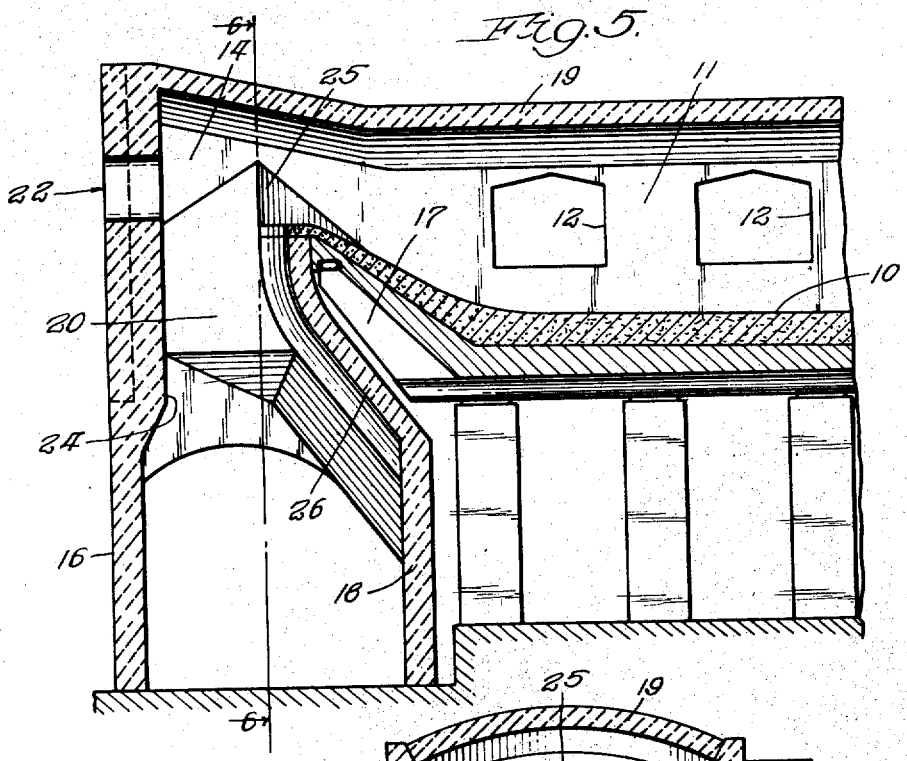
Fig. 5 is a view similar to Fig. 2 of the furnace end structure illustrated in Fig. 4.
Figure 6:
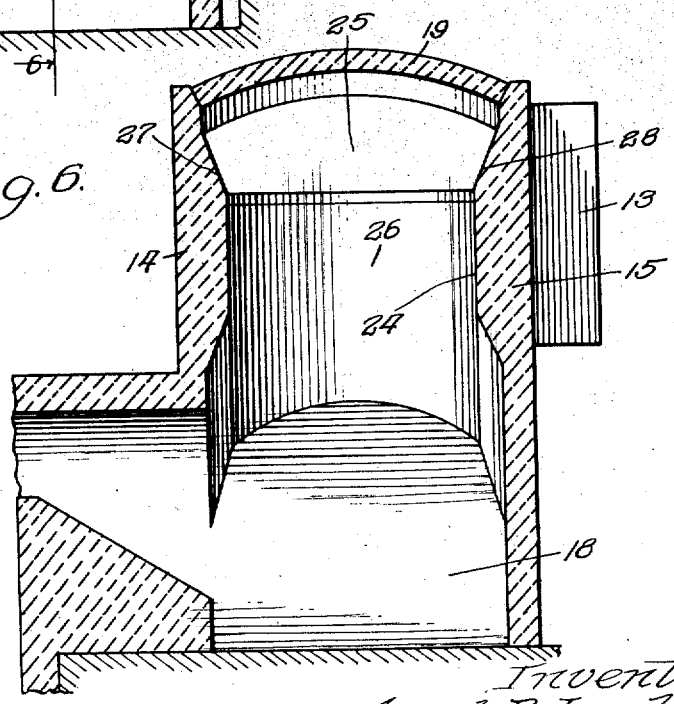
Fig. 6 is a sectional view taken substantially along line 6—6 in Fig. 5.
Figure 8:
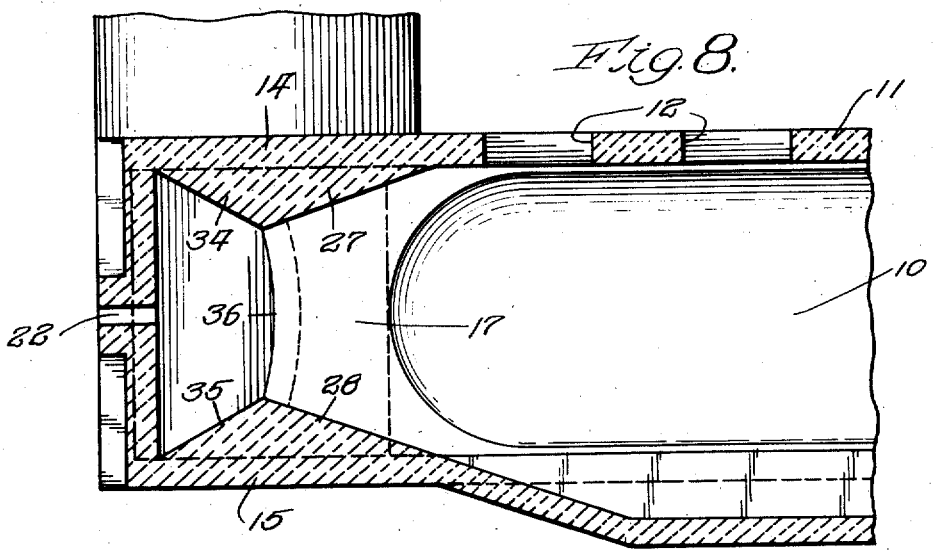
Fig. 8 is a fragmentary plan view with the roof removed of a third furnace structure.
Figure 9:
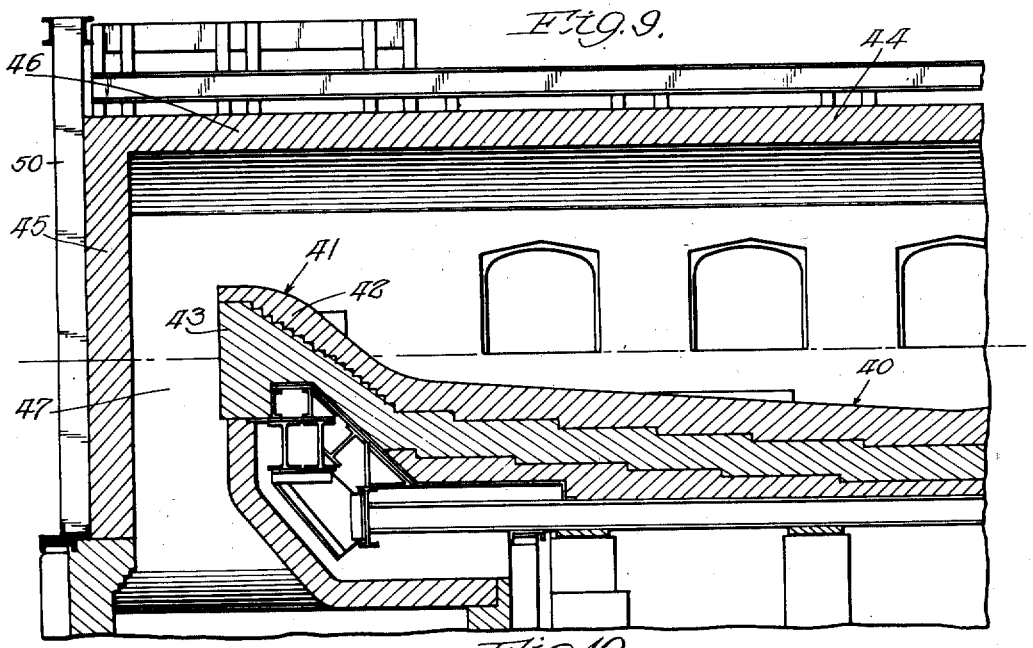
Fig. 9 is a fragmentary vertical sectional view through one end of a furnace exemplary of the invention herein and designated Furnace "B" in the specification.
Figure 10:
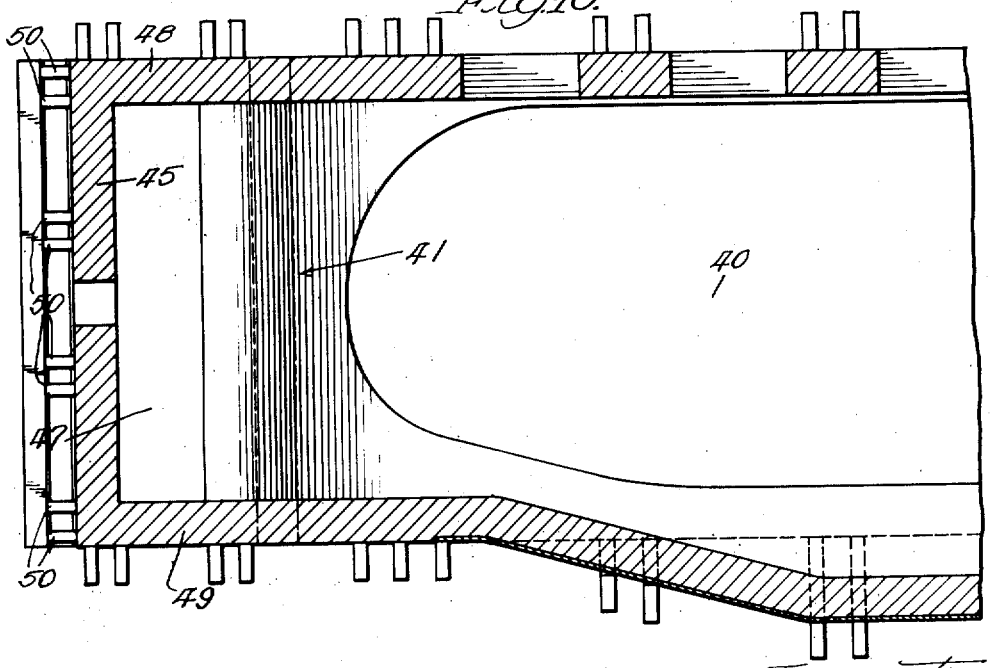
Fig. 10 is a fragmentary horizontal sectional view taken substantially at the foreplate elevation of the furnace shown in Fig. 9.
Figure 11:
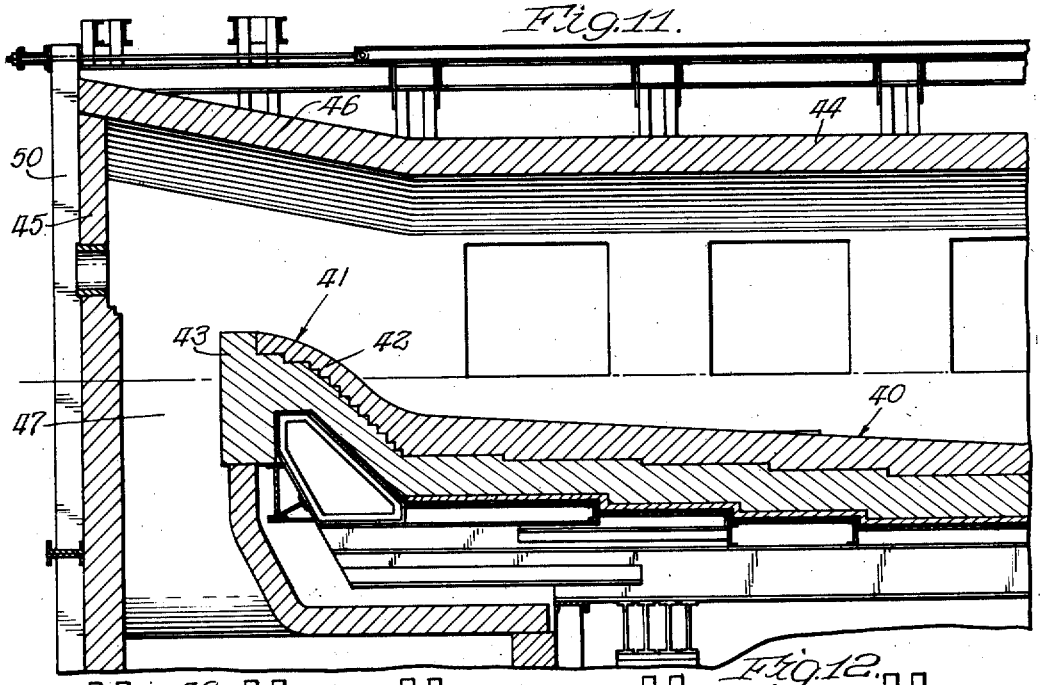
Fig. 11 is a fragmentary vertical sectional view through one end of a furnace exemplary of the invention herein and designated Furnace "C" in the specification.
Figure 12:
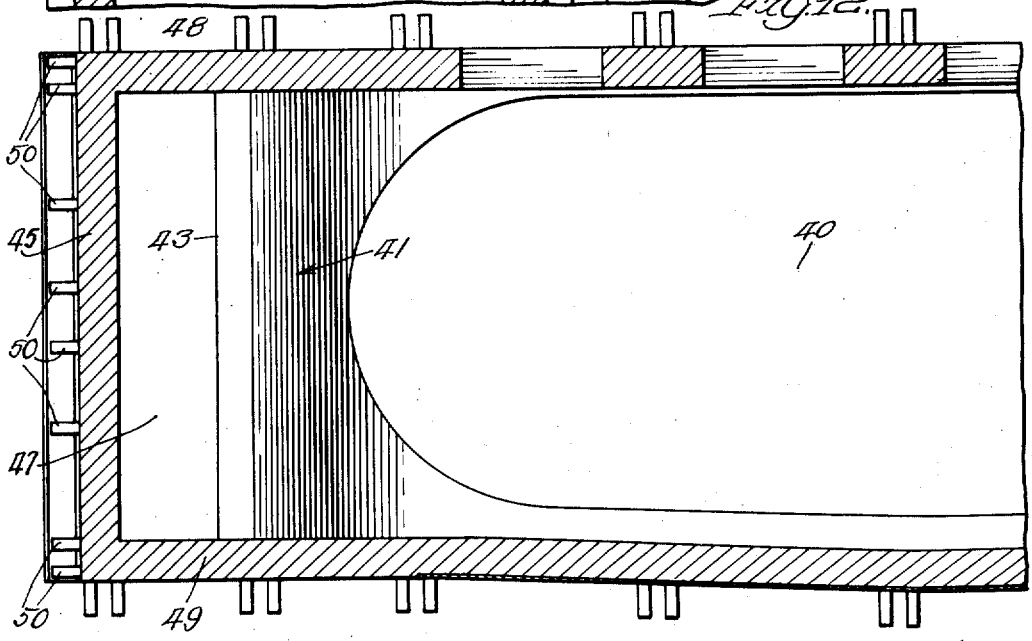
Fig. 12 is a fragmentary horizontal sectional view taken substantially at the foreplate elevation of the furnace shown in Fig. 11.
Figure 13:
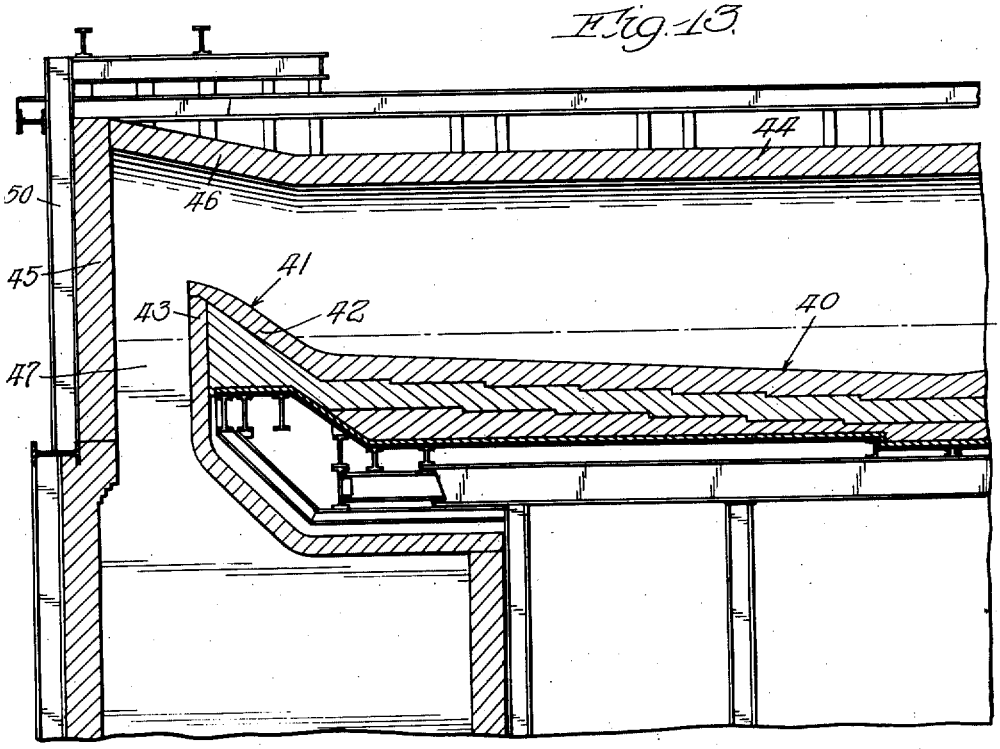
Fig. 13 is a fragmentary vertical sectional view through one end of a furnace exemplary of the invention herein and designated Furnace "D" in the specification.
Figure 14:
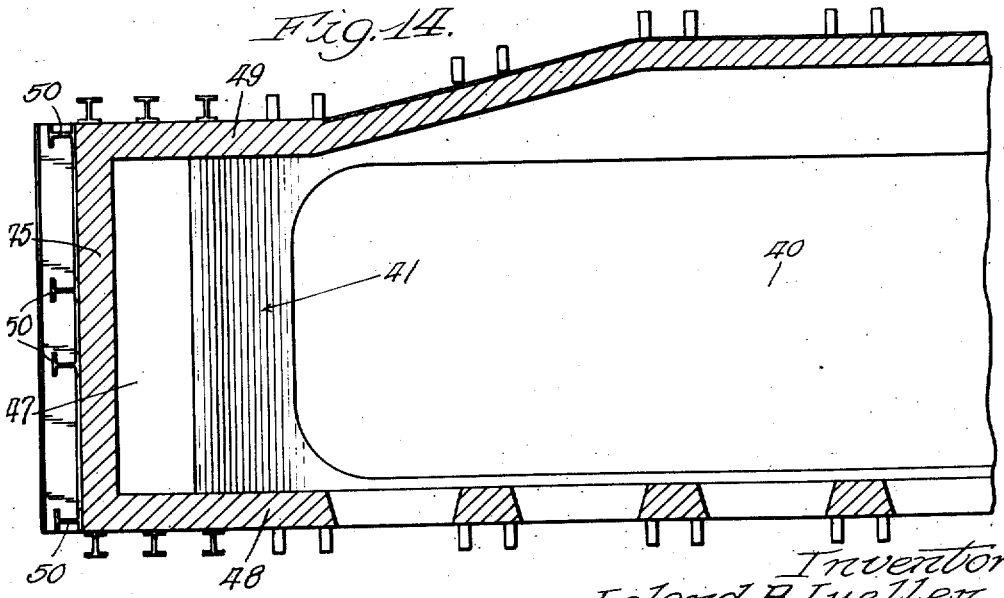
Fig. 14 is a fragmentary horizontal sectional view taken substantially at the foreplate elevation of the furnace shown in Fig. 13.

As will be noted in the figures of the drawings, openings are provided in the end walls for the insertion of burners which introduce the fuel into the furnace. Thus as illustrated in Fig. 1, each end wall is provided with two burners 22, each directed generally downwardly and inwardly toward the surface of the molten mass contained within the hearth section. Fuel from the burners 22 is mixed with air brought upwardly through the uptake 20 and is fired at the burner tip. Figs. 4 and 8 illustrate an open-hearth furnace having a single burner 22 located centrally in the end wall 16.

Open-hearth furnaces are operated by regenerating the air used to fire the fuel. Thus air is passed over hot checkerwork which was previously heated by the exhaust gases from the furnace. The air is brought to a very high temperature before mixture with the fuel, thereby increasing the temperature of the furnace. The uptake passages 20 convey this heated air through a generally vertical lower portion 24 which ends at the roof 19 of the furnace and then through the upper portion or throat 25 to the furnace hearth section. Previous and existing open-hearth furnaces utilize a multiple uptake passage made necessary by the existence of a heavy center wall and supporting arch which strengthened the furnace end structures and provided support for the chill boxes. Thus the brickwork under and around the chill box was of sprung arch construction with skew-backs resting against the center wall and the wing walls. In the present construction, this center arch and wall are dispensed with and a single uptake passage is provided. Thus as seen in Figs. 1 and 2, the uptake passage is bounded by the wing walls, the end wall and the section wall and chill box section. The passage is narrowed by the chill box protective wall 26 which may be suspended from the chill box section.

Figure 7:
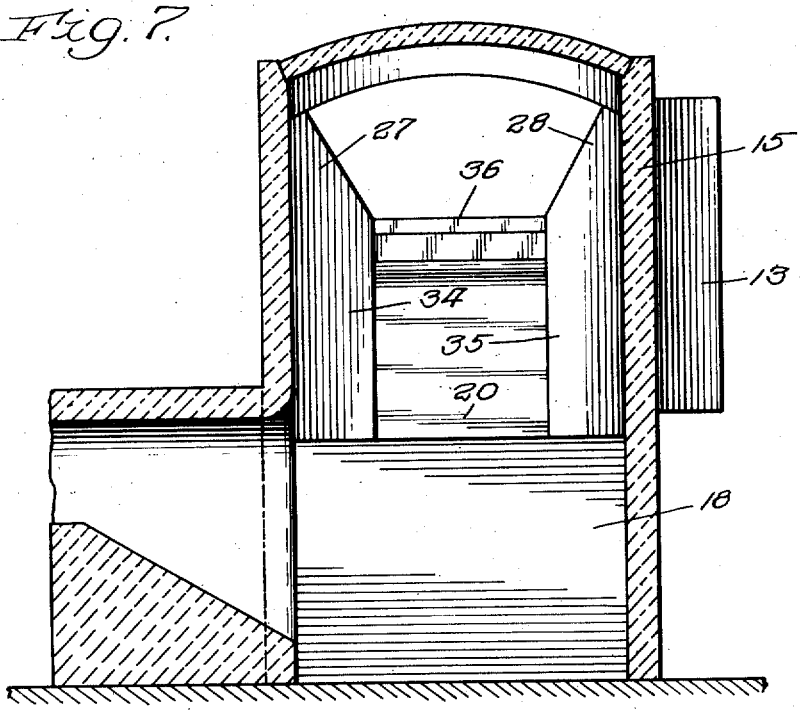
Fig. 7 is a sectional view taken substantially along line 7—7 in Fig. 8 showing a preferred end structure for a single burner.

The throat of the open-hearth furnace here shown takes on a particular shape to convey the air from the vertical [potrion] *portion* 24 of the uptake passage to the hearth section. Thus as best seen in Fig. 1, each of the wing walls on the front and back of the furnace is provided with a portion 27 and 28 extending inwardly toward each other to restrict the throat. This provides a Venturi-type action on the air passing through the throat expanding the air to the center of the furnace and preventing the air from hugging the walls of the furnace. This venturi commonly applied is not, however, required here and may be omitted provided the uptake is properly shaped in relation to the rest of the furnace. I prefer to omit this venturi. In Fig. 1, using two burners in each end of the furnace, the Venturi throat is positioned above the chill box section so as to direct the air into the stream of fuel introduced by the burners. In Fig. 4 it will be noticed that the restricted throat providing the Venturi action has been omitted. In Fig. 4 the restricted portion is substantially above the end of the chill box section and provides a streamlining effect to passage of gas in either direction. Figs. 7 and 8 show the preferred form of end structure for a single burner at each end. Here the portion of the uptake opposite the chill box has been made generally trapezoidal in shape by built-in portions 34 and 35 to direct the air toward the burner. Above the bridgewall 36, portions 27 and 28 streamline the front and rear wing walls between the uptake and the hearth.

In removing the center arch and wall a substantial volume within the furnace end structure is recovered. In those furnaces previously using multiple uptake passages, this recovered volume may be used for either or both of two purposes. If the uptake capacity of the furnace was inadequate, the recovered volume may be used to increase the capacity of the uptake section, or such recovered volume may be used to increase the capacity of the hearth section by moving the chill boxes closer to the end walls of the furnace. This capacity increase may be accomplished without rebuilding the major portion of the furnace and without changing its outside dimensions.

As an example, it was found that the capacity of the hearth section could be increased slightly more than 5% by moving the chill boxes a total of 2 ft. 1¾ in. outwardly from their former position. This was done without incurring any decrease in the air capacity of the uptake passages. As noted in Figs. 1 and 2, this change of capacity may be stated in terms of a ratio of the length of the uptake passages to the length of the furnace hearth. These dimensions are both measured at the mean sill plate level which is herein defined as the usual datum plane in open-hearth structures, that being the mean level of the lowest point in the charging door openings. The length of the uptake passages designated A′ on the drawing is taken between the end steelwork of the chill box section and the buckstays or binding at the end of the furnace. The length of both uptakes so measured is taken as the dimension A in the ratio. The dimension B is the total length of the furnace hearth between the outside of the steelwork of the chill boxes. The total of A plus B will equal the length of the furnace inside the binding.

Previous to the removal of the center wall and arch, dimension A totaled 20 ft. 3 inch. and dimension B, 49 ft. 10 in. The total is 70 ft. 1 in. between the end buckstays of the furnace which may not be moved outwardly because of limitation in space between adjacent furnaces. The ratio of A to B was 1 to 2.46 in existing furnaces of this size.

The chill boxes of this particular furnace were each moved outwardly 12⅞ in., a total distance of 2 ft. 1¾ in. which changes dimension A to 18 ft. 1¼ in. and B was 51 ft. 11¾ in. The ratio of A to B was thus changed to 1 to 2.87 and the resultant increase in hearth capacity was slightly over 7%. This relationship is expressed in terms of bath length, uptake size and throat size for this particular furnace and for other furnaces in the specific examples given hereafter.

In other furnaces of the same size having the same hearth section, the chill boxes may be moved outwardly toward the end wall as much as three feet each. This may be done without materially changing the uptake efficiency of the furnace ends and with substantial increase in the productive capacity of the furnace itself. Life of the refractory elements is materially increased since baffling and channeling of the gases leaving the furnace are in a large part eliminated.

The relationship of the position of the chill boxes and the end walls of the furnace are thus changed to effect a greater capacity without changing outside dimensions of the furnace. The changed position of the chill boxes is herein defined as substantially close to the end walls to distinguish the new position from that originally found in furnaces employing multiple uptake passages. The chill boxes are nearer the end walls than in comparable size furnaces employing multiple uptake passages.

It has been found that the single uptake passage provides a more even flow of air to the furnace. The volumes recovered by removal of the previously present center structures may be utilized as desired, either for increasing capacity of the furnace by lengthening the hearth section or for increasing the uptake capacity at the furnace ends.

It has been found that gases passing out of the furnace have erroded the brickwork most severely in the area about the end wall and center dividing wall intersection in multiple uptake furnaces. This erosion may be materially decreased by shaping the uptake passage to decrease the velocity of the gases in the area where erosion previously had been most severe. In Figs. 7 and 8, the uptake passage is shown as trapezoidal in horizontal cross section with the base or larger parallel side formed by the end wall of the furnace. The wing walls 14 and 15 may be shaped to provide the requisite tapering at the front and back of the furnace. Above the chill box, the wing wall taper is used to provide a streamlining leading from the uptake to the hearth section which further insures the rapid mixture of fuel and air as previously described. This shape allows expansion of outgoing gases adjacent the end wall, thus decreasing corrosion of the end wall refractory elements. Generally, the trapezoidal shape will be retained from the bottom of the chill box section to the top of the bridgewall 36 above the chill box. Incoming air is spread by this shape uptake, preventing air from hugging the walls of the furnace and providing better distribution thereof to the burners.

The previously mentioned increase in capacity of the hearth bed may be expressed in terms of the longitudinal length of the hearth bed inside the refractory of the bed measured at the foreplate elevation related to the total length of the furnace side and the structural binding. In the example given above, the length of the hearth bed [(between steel)] before the chill boxes were moved was 44 feet 6 inches and afterward it was 46 feet 7¾ inches [(steel to steel)]. The new bed is approximately 66% of the total length of furnace (70 feet 1 inch) inside bindings. Further movement of the chill boxes toward the end walls will increase the hearth bed.

The uptake passage may be defined in relation to the longitudinal length of the furnace inside the bindings in terms of a ratio of the combined length of the uptakes inside brickwork measured at their narrowest section along the longitudinal axis of the furnace, to the above mentioned longitudinal dimension of the furnace. In the example previously given, the chill boxes were moved outwardly toward the end walls, thus increasing the hearth length and resulting in a combined length of uptake passage equal to approximately 16% of the total length of the furnace. Further movement of the chill boxes toward the end walls would result in a combined length of uptake passages as above defined equal to a smaller proportion of the total length of the furnace.

In forming a single uptake at each end of the furnace, the air capacity of the furnace was improved to permit a much greater firing rate. In the example, the cross sectional area in square feet of the single uptake when measured at its narrowest section was equal to 86% of the longitudinal length of the furnace inside the bindings in feet, and it is preferred not to exceed this proportion.

The furnaces shown in Figs. 9 through 14 are examples of actual furnaces made in accordance with this invention. The drawings are made to scale and may be used for determining dimensions where necessary although in the following tables the critical dimensions of the furnaces are given.

Each of the furnaces has a hearth bed 40 formed with an end portion generally designated 41 which may be more accurately defined as a bridgewall 42 and a protective chill wall 43 about the end portion of the hearth. The foreplate elevation is designated on the drawings and ordinarily the bath extends up to this elevation so that the point adjacent the bridgewall 42 which defines the end of the bath is immediately apparent.

An arched roof structure 44 covers the main portion of the furnace over the bath and is joined to the end wall 45 of the furnace by a section 46 referred to as a skew-back. Between this section 46 and the bridgewall 42 is an area referred to as the throat of the furnace. The space between the end wall 45 and the protective chill wall 43 is referred to as an uptake here designated as 47. It will be noticed that in each of these furnaces the uptake passage is a single opening extending across the width of the furnace from the front wing wall 48 to the rear wing wall 49.

In each of the furnaces shown, the bath length has been increased by moving the ends of the hearth bed toward the end wall of the furnace. It should be understood that the end wall cannot be moved outwardly to increase the length of the furnace and that such length is determined by the bindings 50. Thus the furnace length inside these bindings (total length outside of end brickwork) is thereby fixed.

The changes made herein are accomplished by rearranging the internal structure of the furnace. The bath length and area are thus increased. The uptake section is rearranged to provide an adequate air supply.

This increased bath area may be used in one of several ways. Steel may be made much more rapidly if the depth of the bath is less than it might be. Most furnaces in operation throughout this country are at present overcharged so that the bath depth is greater than desirable. The increased bath area may be used to lower the bath depth.

In instances where the bath depth is not such a critical factor, a greater amount of steel may be made by simply increasing the charge. Such has been the experience with the furnaces illustrated in that the steel production per hour has greatly increased.

The following tables give a comparison of these furnaces before and after they were changed in accordance with the present invention. Certain critical features relating to relative sizes of the bath, the uptakes, and the throat are also given. It should be understood that these examples are given as illustrative and are not be taken as limiting.

FURNACE "A"

Some of the dimensions of this furnace are given in the foregoing description. A comparison is given below indicating the changes that have been made in the furnace in accordance with the invention herein.

| | Dimensions of Furnace | |
|---|---|---|
| | Before | After |
| Length of furnace outside brickwork (inside steel bindings). | 70′—1″ | 70′—1″. |
| Length of hearth at fore-plate elevation inside refractory. | 40′—0″ | 42′—1½″. |
| Uptake | double | single. |
| area—narrowest section | 83.4 sq. ft. | 60.0 sq. ft. |
| combined length | 12′—10″ | 10′—7″. |
| Throat—narrowest section | 72.5 sq. ft. | 65.2 sq. ft. |
| Ratios: | | |
| Percent of total length of furnace outside brickwork occupied by hearth at foreplate elevation. | 57.1% | 60.1%. |
| Percent of total length of furnace outside brickwork occupied by length of both uptakes. | 18.33% | 15.1%. |
| Combined length of uptake passages to length of hearth between refractories. | 1 to 3.1 | 1 to 4. |

FURNACE "B"

| | Dimensions of Furnace | |
|---|---|---|
| | Before | After |
| Length of furnace outside brickwork (inside steel bindings). | 60′—0″ | 60′—0″. |
| Length of hearth at foreplate elevation inside refractory. | 30′—8″ | 41′—0″. |
| Uptake | double | single. |
| area—narrowest section | 56.6 sq. ft. | 42.75 sq. ft. |
| combined length | 11′—4″ | 6′—0″. |
| Throat—narrowest section | 37.5 sq. ft.[1] | 40 sq. ft.[1] |
| Ratios: | | |
| Percent of total length of furnace outside brickwork occupied by hearth at foreplate elevation. | 51.1% | 68.3%. |
| Percent of total length of furnace outside brickwork occupied by length of both uptakes. | 18.8% | 10%. |
| Combined length of uptake passages to length of hearth between refractories. | 1 to 2.71 | 1 to 6.83. |

[1] Approximately.

FURNACE "C"

| | Dimensions of Furnace | |
|---|---|---|
| | Before | After |
| Length of furnace outside brickwork (inside steel bindings). | 70′—1″ | 70′—1″. |
| Length of hearth at foreplate elevation inside refractory. | 40′—0″ | 50′—0″. |
| Uptake | double | single. |
| area—narrowest section | 83.9 sq. ft. | 61.4 sq. ft. |
| combined length | 16′—3″ | 7′—4″. |
| Throat—narrowest section | 67.5 sq. ft.[1] | 83.3 sq. ft.[1] |
| Ratios: | | |
| Percent of total length of furnace outside brickwork occupied by hearth at foreplate elevation. | 57.1% | 71.4%. |
| Percent of total length of furnace outside brickwork occupied by length of both uptakes. | 19.04% | 10.42%+. |
| Combined length of uptake passages to length of hearth between refractories. | 1 to 2.46 | 1 to 6.82. |

[1] Approximately.

FURNACE "D"

| | Dimensions of Furnace | |
|---|---|---|
| | Before | After |
| Length of furnace outside brickwork (inside steel bindings). | 91′—0″ | 91′—0″. |
| Length of hearth at foreplate elevation inside refractory. | 58′—0″ | 68′—6″. |
| Uptake | double | single. |
| area—narrowest section | 108.25 sq. ft.[1] | 71.0 sq. ft. |
| combined length | 17′—4″ | 8′—0″. |
| Throat—narrowest section | 47.0 sq. ft.[1] | 77.0 sq. ft.[1] |
| Ratios: | | |
| Percent of total length of furnace outside brickwork occupied by hearth at foreplate elevation. | 63.7% | 75.3%. |
| Percent of total length of furnace outside brickwork occupied by length of both uptakes. | 19.04% | 8.79%. |
| Combined length of uptake passages to length of hearth between refractories. | 1 to 3.35 | 1 to 8.56. |

[1] Approximately.

While this invention is susceptible of embodiment in many different forms, there has been shown in the drawings and described in detail only specific embodiments with the understanding that the present disclosure is to be considered a an exemplification of the principles of the invention and is not intended to limit the invention to the embodiments illustrated. The scope of the invention will be pointed out in the appended claims.

I claim:

1. An open hearth furnace comprising a hearth section having a hearth bed, wing walls and an end wall joined together to form a furnace end section at each end of the hearth section, each furnace end section having a single uptake passage for conducting air to the hearth section, said furnace having a throat above the ends of the hearth communicating with the untake passage and hearth bed, said hearth bed having a length measured between refractories at the foreplate elevation equal to between 60% to 75% of the total furnace length inside bindings and a combined length of uptake passages equal to between 8% to 15% of said furnace length, the ratio of said uptake passage length to said hearth length being between 1 to 4 and 1 to 8.6 and said throat having an area in its narrowest section at least substantially as large as the narrowest section of said uptake passage, the minimum horizontal dimension of said throat approaching the width of the uptake passage.

2. An open hearth furnace comprising a hearth section having a hearth bed, wing walls and an end wall joined together to form a furnace end section at each end of the hearth section, each furnace end section having a single uptake passage for conducting air to the hearth section, said furnace having a throat above the ends of the hearth communicating with the uptake passage and hearth bed, said hearth bed having a length measured between refractories at the foreplate elevation such that the combined length of the uptake passages at the same elevation taken therefrom is equivalent to more than 45% of the furnace length measured inside its bindings, said throat area at its narrowest section being at least substantially as large as the narrowest section of said uptake passage, the minimum horizontal dimension of said throat approaching the width of the uptake passage.

3. An open hearth furnace comprising a hearth section having a hearth bed, wing walls and an end wall joined together to form a furnace end section at each end of the hearth section, each furnace end section having a single uptake passage for conducting air to the hearth section, said furnace having a throat above the ends of the hearth communicating with the uptake passage and hearth bed, said hearth bed being relatively long with relation to the furnace length, the length of the hearth bed measured between refractories at the foreplate elevation being at least four times the combined length of the uptake passages measured between refractories at the foreplate elevation; and said throat having an area at its narrowest section at least substantially as large as the narrowest section of said uptake passage, the minimum horizontal dimension of said throat approaching the width of the uptake passage.

4. An open hearth furnace comprising a hearth section having a hearth bed and an end section at each end of the furnace having a single uptake passage for conducting air to the hearth section, said furnace having a throat above each end of the hearth section communicating with the uptake passage and the hearth bed, said hearth bed being relatively long with relation to the furnace length and having a length between refractories at the foreplate elevation in excess of 60% of the furnace length between bindings with a combined uptake length less than 15% of said furnace length, said throat having an area at its narrowest section at least substantially as large as the narrowest section of the uptake passage, the minimum horizontal dimension of said throat approaching the width of the uptake passage.

5. An open hearth furnace as set forth in claim 4 in which the hearth bed as specified occupies between 65% of said furnace length.

6. An open hearth furnace as set forth in claim 4 in which the hearth bed as specified occupies between 65% and 75.3% of said furnace length.

7. An open hearth furnace comprising a hearth section with a chill box at each end, wing walls and an end wall joined together to form a furnace end section adjoining said hearth section, a section wall around and under each chill box and extending between said wing walls, said walls forming a single uptake passage at each end of the furnace for conducting air to the hearth section, means for introducing air to said uptake passages, a fuel supply at each end of the furnace for directing fuel toward the hearth section, the length of the hearth section between the metal of the chill boxes on the hearthside of each measured at the sill plate elevation being about 2.87 times the combined length of the uptake passages between metal, the passage from the uptake passage to the hearth being at least substantially as large as the uptake passage and the minimum horizontal dimension of said throat approaching the width of the uptake passage.

8. An open hearth furnace as set forth in claim 7 in which the hearth bed between refractories at the foreplate elevation occupies between about 60 to 75% of the length of the furnace inside structural bindings.

9. An open hearth furnace having a hearth section and a fuel supply at each end of the furnace, a single uptake passage at each end of the furnace communicating with the hearth section and an air supply, said uptake passages having a combined length at their narrowest section inside brickwork measured in the direction along the longitudinal axis of the furnace of not more than .16 times the total length of the furnace inside bindings measured at the foreplate line said uptake passages communicating with said hearth section through a throat, the minimum horizontal dimension of said throat approaching the width of the uptake passage.

10. An open hearth furnace comprising a hearth section having a hearth bed, wing walls and an end wall joined together to form a furnance end section at each end of the hearth section, each furnace end section having a single uptake passage for conducting air to the hearth section, said furnace having a throat above the ends of the hearth communicating with the uptake passage and hearth bed, said hearth bed having a length measured between refractories at the foreplate elevation equal to between 60% to 75% of the total furnace length inside bindings and a combined length of uptake passages equal to between 8% to 15% of said furnace length, the ratio of said uptake passage length to said hearth length being between 1 to 4 and 1 to 8.6 and said throat having an area in its narrowest section at least substantially as large as the narrowest section of said uptake passage.

*11. An open hearth furnace constructed of refactory brick and having exterior structural bindings for supporting said refractory brick comprising a hearth section having a hearth bed and an end section at each end of the furnace having an end wall adjacent said bindings and being provided with a single uptake passage for conducting air to said hearth section communicating with the hearth section through a throat area, means for supplying air to said uptake passages and means for supplying fuel, said uptake passages having a combined length at their narrowest section inside brickwork measured in the direction along the longitudinal axis of the furnace of not more than 0.16 times the total length of the furnace inside said bindings measured at the means sill plate line, said hearth bed being relatively long with relation to the furnace length and said throat area being substantially unrestricted with respect to the shape of the uptake passage connecting with said throat area to minimize the resistance of the passage of gas therethrough.*

*12. An open hearth furnace constructed of refactory brick and having exterior structural bindings for supporting said refractory brick comprising a hearth section having a hearth bed and an end section at each end of the furnace having an end wall adjacent said bindings and being provided with a single uptake passage for conducting air to said hearth section communicating with the hearth section through a throat area, means for supplying air to said uptake passages and means for supplying fuel through the end walls in said end sections, said uptake passages having a combined length at their narrowest section inside brickwork measured in the direction along the longitudinal axis of the furnace of not more than 0.16 times the total length of the furnace inside said bindings measured at the mean sill plate line, said hearth bed being relatively long with relation to the furnace length and said throat area being substantially unrestricted with respect to the shape of the uptake passage connecting with said throat area to minimize the resistance of the passage of gas therethrough.*

*13. An open hearth furnace constructed of refractory brick and having exterior structural bindings for supporting said refractory brick comprising a hearth section having a hearth bed and an end section at each end of the furnace having an end wall adjacent said bindings and being provided with a single uptake passage for conducting air to said hearth section communicating with the hearth section through a throat area, means for supplying air to said uptakes and means for supplying fuel toward said hearth section, said uptake passages having a combined length at their narrowest section inside brickwork measured in the direction along the longitudinal axis of the furnace of not more than 0.16 times the total length of the furnace inside the structural bindings measured at*

*the mean sill plate level, said hearth bed being relatively long with relation to the furnace length and having a length between refractories at the mean sill plate level in excess of about 66% of the furnace length between said bindings, said throat area being substantially unrestricted with respect to the shape of the uptake passage connecting with said throat area to minimize the resistance of the passage of gas therethrough.*

*14. An open hearth furnace having a hearth section and a fuel supply at each end of the furnace, a single uptake passage at each end of the furnace communicating with the hearth section through a throat area, and an air supply, said uptake passages having a combined length at their narrowest section inside brickwork measured in the direction along the longitudinal axis of the furnace of not more than 0.16 times the total length of the furnace inside bindings measured at the mean sill plate line, said hearth bed being relatively long with relation to the furnace length and having a length between refractories at the means sill plate level in excess of about 66% of the furnace length between said bindings, and said throat area having a minimum horizontal dimension which approaches the width of the uptake passage.*

References Cited in the file of this patent or the original patent

UNITED STATES PATENTS

| | | |
|---|---|---|
| 1,501,532 | Egler | July 15, 1924 |
| 1,564,049 | Davies | Dec. 1, 1925 |
| 2,169,163 | Putnam | Aug. 8, 1939 |
| 2,226,922 | Chambers et al. | Dec. 31, 1940 |
| 2,385,261 | Crowe | Sept. 18, 1945 |
| 2,429,880 | Hays | Oct. 28, 1947 |
| 2,548,908 | Pollen | Apr. 17, 1951 |

OTHER REFERENCES

Pages 298–304 inc., volume 34 of the Open Hearth Proceeding of the meeting held April 2–4, 1951, by the National Open Hearth Steel Committee, published by the AIMME, 29 West 39th Street, N.Y. 18, N.Y.